(12) United States Patent
Mun

(10) Patent No.: US 10,587,910 B2
(45) Date of Patent: Mar. 10, 2020

(54) DISPLAY DEVICE FOR PROVIDING SCRAPE FUNCTION AND METHOD OF OPERATING THE SAME

(71) Applicant: LG ELECTRONICS INC., Seoul (KR)

(72) Inventor: Duhyun Mun, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/582,435

(22) Filed: Apr. 28, 2017

(65) Prior Publication Data
US 2017/0318327 A1  Nov. 2, 2017

(30) Foreign Application Priority Data
Apr. 28, 2016 (KR) .................. 10-2016-0052539

(51) Int. Cl.
| | |
|---|---|
| *H04N 21/218* | (2011.01) |
| *H04N 21/20* | (2011.01) |
| *H04N 21/431* | (2011.01) |
| *H04N 21/458* | (2011.01) |
| *H04N 21/472* | (2011.01) |
| *H04N 21/488* | (2011.01) |

(Continued)

(52) U.S. Cl.
CPC ....... *H04N 21/4312* (2013.01); *H04N 5/4403* (2013.01); *H04N 5/44591* (2013.01); *H04N 21/4126* (2013.01); *H04N 21/42209* (2013.01); *H04N 21/84* (2013.01); *H04N 21/8586* (2013.01)

(58) Field of Classification Search
None
See application file for complete search history.

(56) References Cited

U.S. PATENT DOCUMENTS

| | | |
|---|---|---|
| 9,456,130 B2 | 9/2016 | Kim et al. |
| 2009/0300679 A1 | 12/2009 | Hiroi et al. |

(Continued)

FOREIGN PATENT DOCUMENTS

| | | |
|---|---|---|
| KR | 1020130081181 | 7/2013 |
| KR | 1020150002193 | 1/2015 |

(Continued)

OTHER PUBLICATIONS

PCT International Application No. PCT/KR2017/001462, International Search Report dated May 22, 2017, 3 pages.

(Continued)

*Primary Examiner* — Jean D Saint Cyr
(74) *Attorney, Agent, or Firm* — Lee, Hong, Degerman, Kang & Waimey PC

(57) ABSTRACT

A display device for providing a scrape function includes a tuner, an external device interface for pairing with an external device, a user input interface for receiving user input, a storage for storing scrape data, a display for displaying content, and a controller for controlling operation of the display device. The controller performs control to update scrape data received from the external device upon pairing with the external device, to generate thumbnails of a plurality of content associated with the scrape data, and to arrange and display the thumbnails based on a predetermined thumbnail arrangement method.

16 Claims, 13 Drawing Sheets

(51) Int. Cl.
*H04N 21/858* (2011.01)
*H04N 5/44* (2011.01)
*H04N 5/445* (2011.01)
*H04N 21/41* (2011.01)
*H04N 21/422* (2011.01)
*H04N 21/84* (2011.01)

(56) References Cited

U.S. PATENT DOCUMENTS

| | | | |
|---|---|---|---|
| 2010/0208069 A1* | 8/2010 | Rezvani | H04L 29/06 |
| | | | 348/143 |
| 2011/0007901 A1 | 1/2011 | Ikeda et al. | |
| 2011/0267291 A1 | 11/2011 | Choi et al. | |
| 2012/0084713 A1* | 4/2012 | Desai | G06F 9/452 |
| | | | 715/788 |
| 2014/0105397 A1* | 4/2014 | Ikeda | H04B 5/02 |
| | | | 380/270 |
| 2014/0365914 A1* | 12/2014 | Peng | H04L 51/046 |
| | | | 715/752 |
| 2015/0058369 A1* | 2/2015 | Kong | H04L 67/02 |
| | | | 707/756 |
| 2016/0142760 A1 | 5/2016 | Son | |
| 2016/0274771 A1 | 9/2016 | Seong et al. | |
| 2017/0142484 A1* | 5/2017 | Jeon | H04L 67/22 |
| 2018/0192152 A1* | 7/2018 | Ellis | H04N 5/44543 |

FOREIGN PATENT DOCUMENTS

| | | |
|---|---|---|
| KR | 1020150050883 | 5/2015 |
| KR | 1020150136314 | 12/2015 |
| WO | 2015060470 | 10/2013 |

OTHER PUBLICATIONS

European Patent Office Application Serial No. 177897535, Search Report dated Sep. 23, 2019, 7 pages.

* cited by examiner

FIG. 11
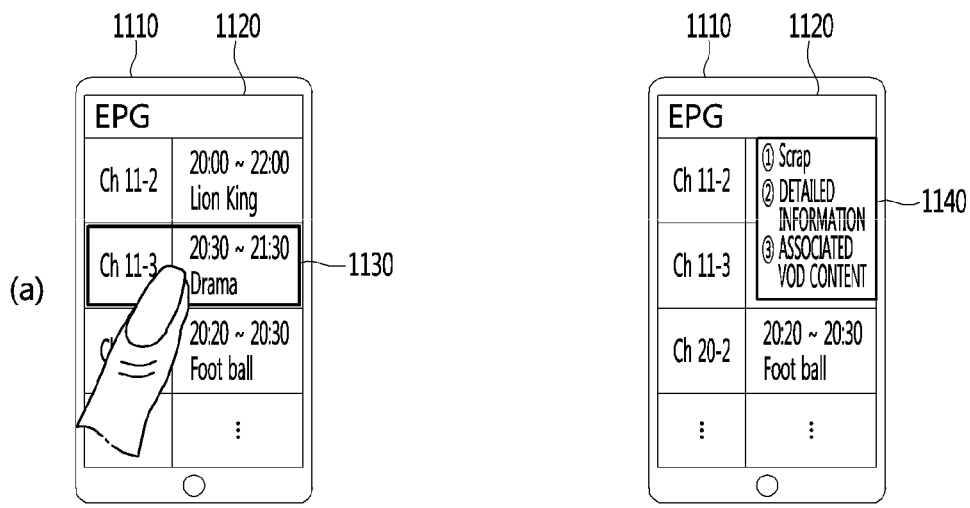
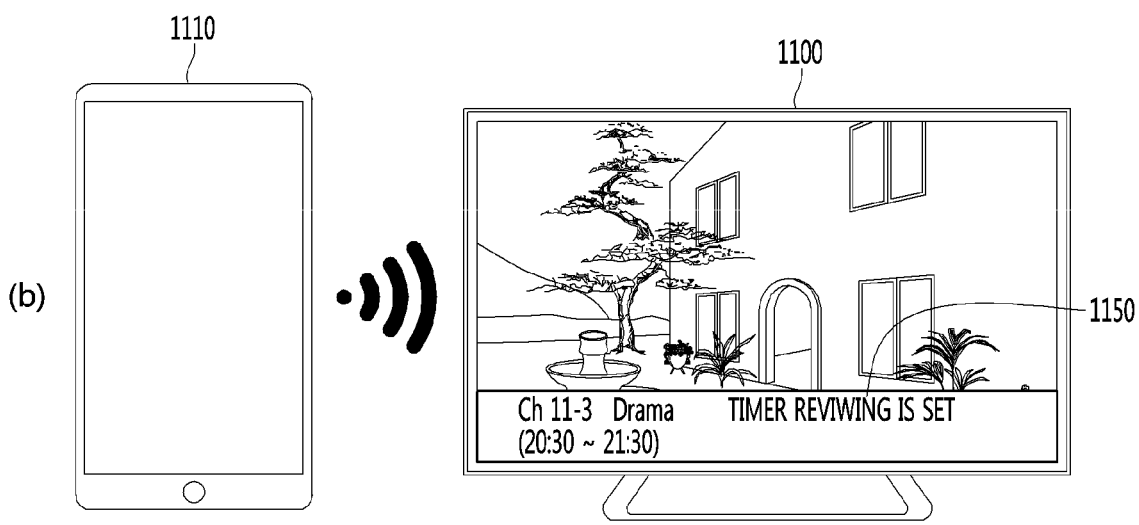

DISPLAY DEVICE FOR PROVIDING SCRAPE FUNCTION AND METHOD OF OPERATING THE SAME

CROSS-REFERENCE TO RELATED APPLICATIONS

Pursuant to 35 U.S.C. § 119(a), this application claims the benefit of earlier filing date and right of priority to Korean Patent Application No(s). 10-2016-0052539, filed on Apr. 28, 2016, the contents of which are hereby incorporated by reference herein in its entirety.

TECHNICAL FIELD

The present invention relates to a display device and a method of operating the same.

BACKGROUND ART

A digital TV service using a wired or wireless communication network has come into wide use. The digital TV service may provide various services which cannot be provided by an existing analog broadcast service.

For example, an Internet protocol television (IPTV) service or a smart TV service which is a digital TV service provides interactivity for enabling a user to actively select a type of a program to be viewed, a viewing time, etc. The IPTV service or the smart TV service may provide various additional services, e.g., Internet search, home shopping, online games, etc. based on such interactivity.

In addition, recently, a display device may perform pairing with an external device, receive and process data stored in the external device and display the data on a screen.

DISCLOSURE

Technical Problem

An object of the present invention is to conveniently and rapidly deliver data stored or scraped in an external device to a display device.

Another object of the present invention is to enable a user to intuitively recognize scraped content by arranging scrape data using a thumbnail arrangement method.

Another object of the present invention is to easily and rapidly view scraped content by providing various thumbnail arrangement methods to a user.

Technical Solution

The object of the present invention can be achieved by providing a method of controlling a display device for providing a scrape function including pairing with an external device, updating scrape data received from the external device, generating thumbnails of a plurality of content associated with the scrape data, and arranging and displaying the thumbnails based on a predetermined thumbnail arrangement method.

According to another aspect of the present invention, there is provided a display device for providing a scrape function including a tuner, an external device interface for pairing with an external device, a user input interface for receiving user input, a storage for storing scrape data, a display for displaying content, and a controller for controlling operation of the display device, wherein the controller performs control to update scrape data received from the external device upon pairing with the external device, to generate thumbnails of a plurality of content associated with the scrape data, and to arrange and display the thumbnails based on a predetermined thumbnail arrangement method.

Advantageous Effects

The effects of the present invention are as follows.

According to one embodiment of the present invention, it is possible to conveniently and rapidly deliver data stored or scraped in an external device to a display device.

According to another embodiment of the present invention, it is possible to conveniently and rapidly display data stored or scraped in an external device to a display device.

According to another embodiment of the present invention, it is possible to easily and rapidly view scraped content by providing various thumbnail arrangement methods to a user.

DESCRIPTION OF DRAWINGS

FIG. 11 is a diagram illustrating a method of setting viewing reservation using scrape data in a display device according to an embodiment of the present invention.

BEST MODE

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present invention, for example, as an artificial display device that adds a computer supporting function to a broadcast receiving function, can have an easy-to-use interface such as a writing input device, a touch screen, or a spatial remote controller as an internet function is added while fulfilling the broadcast receiving function. Then, with the support of a wired or wireless internet function, it is possible to perform an e-mail, web browsing, banking, or game function in access to internet and computers. In order for such various functions, standardized general purpose OS can be used.

Accordingly, since various applications are freely added or deleted on a general purpose OS kernel, a display device described in this present invention, for example, can perform various user-friendly functions. The display device, in more detail, can be network TV, HBBTV, smart TV, LED TV, OLED TV, and so on and in some cases, can be applied to a smartphone.

Figure 1:
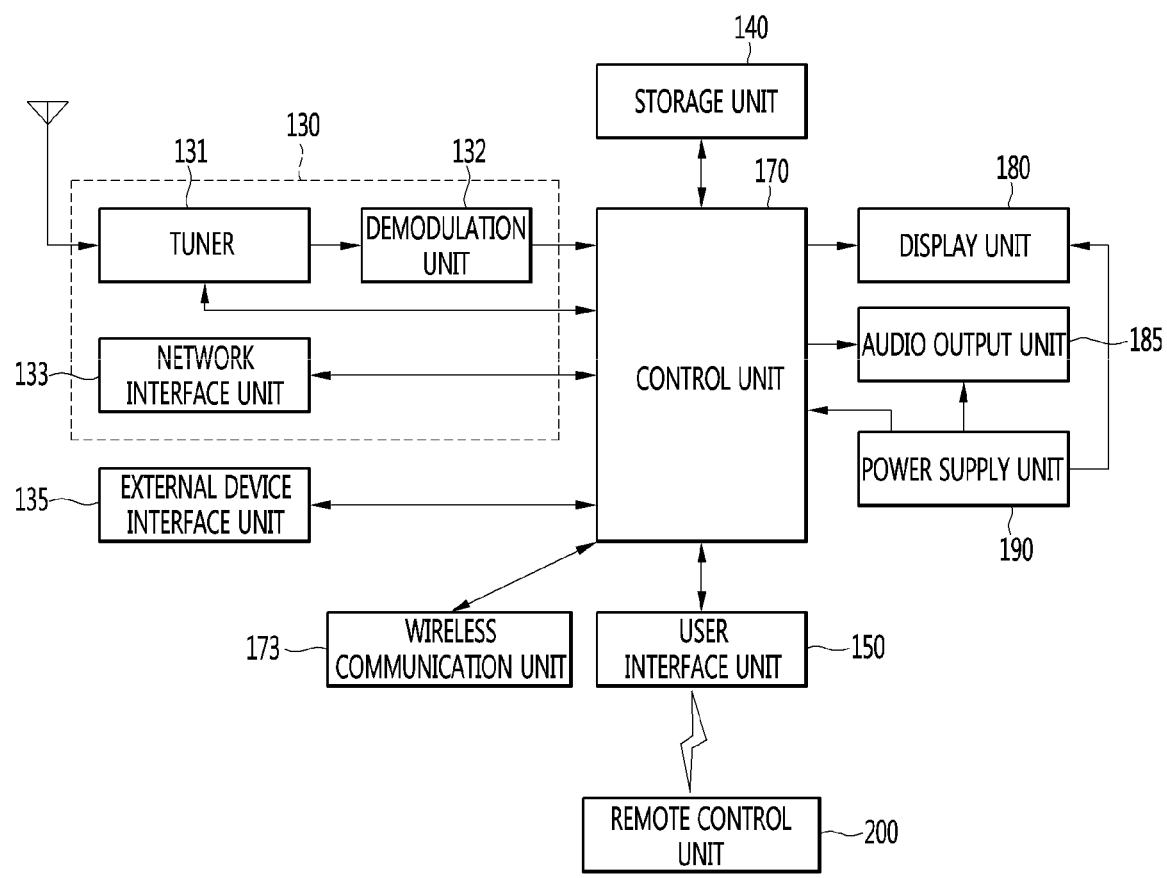
FIG. 1 is a block diagram showing the configuration of a display device according to an embodiment of the present invention.

FIG. 1 is a block diagram illustrating a configuration of a display device according to an embodiment of the present invention.

Referring to FIG. 1, a display device 100 can include a broadcast reception unit 130, an external device interface unit 135, a storage unit 140, a user input interface unit 150, a control unit 170, a wireless communication unit 173, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface 135 can provide a connection path between the display device 100 and an external device. The external device interface 135 can receive at least one of image and audio output from an external device that is wirelessly or wiredly connected to the display device 100 and deliver it to the control unit. The external device interface unit 135 can include a plurality of external input terminals. The plurality of external input terminals can include an RGB terminal, at least one High Definition Multimedia Interface (HDMI) terminal, and a component terminal.

An image signal of an external device inputted through the external device interface unit 135 can be output through the display unit 180. A sound signal of an external device inputted through the external device interface unit 135 can be output through the audio output unit 185.

An external device connectable to the external device interface unit 130 can be one of a set-top box, a Blu-ray player, a DVD player, a game console, a sound bar, a smartphone, a PC, a USB Memory, and a home theater system but this is just exemplary.

The network interface unit 133 can provide an interface for connecting the display device 100 to a wired/wireless network including internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. That is, it can transmit or receive data to or from a corresponding server by accessing a predetermined webpage through network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily store image, voice, or data signals output from the external device interface unit 135 or the network interface unit 133 and can store information on a predetermined image through a channel memory function.

The storage unit 140 can store an application or an application list inputted from the external device interface unit 135 or the network interface unit 133.

The display device 100 can play content files (for example, video files, still image files, music files, document files, application files, and so on) stored in the storage unit 140 and provide them to a user.

The user input interface unit 150 can deliver signals inputted from a user to the control unit 170 or deliver signals from the control unit 170 to a user. For example, the user input interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user input interface unit 150 can deliver, to the control unit 170, control signals inputted from local keys (not shown) such as a power key, a channel key, a volume key, and a setting key.

Image signals that are image-processed in the control unit 170 can be inputted to the display unit 180 and displayed as an image corresponding to corresponding image signals. Additionally, image signals that are image-processed in the control unit 170 can be inputted to an external output device through the external device interface unit 135.

Voice signals processed in the control unit 170 can be output to the audio output unit 185. Additionally, voice signals processed in the control unit 170 can be inputted to an external output device through the external device interface unit 135.

Besides that, the control module 170 can control overall operations in the display device 100.

Additionally, the control unit 170 can control the display device 100 by a user command or internal program inputted through the user input interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user input interface unit 150, the control unit 170 can output image signals or voice signals of an external device such as a camera or a camcorder, which are inputted through the external device interface unit 135, through the display unit 180 or the audio output unit 185.

Moreover, the control unit 170 can control the display unit 180 to display images and control broadcast images inputted through the tuner 131, external input images inputted through the external device interface unit 135, images inputted through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content inputted from the outside, and the content can be in various formats such as broadcast images, external input images, audio files, still images, accessed web screens, and document files.

Moreover, the wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device.

The wireless communication unit 173 can be provided separated from the external device interface unit 135 and can be included in the external device interface unit 135.

The display unit 180 can convert image signals, data signals, or OSD signals, which are processed in the control unit 170, or images signals or data signals, which are received in the external device interface unit 135, into R, G, and B signals to generate driving signals.

Furthermore, the display device 100 shown in FIG. 1 is just one embodiment of the present invention and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present invention described below can be performed by one of the display device described with reference to FIG. 1, an image processing device such as the separated set-top box, and a content playback device including the display unit 180 and the audio output unit 185.

Figure 2:
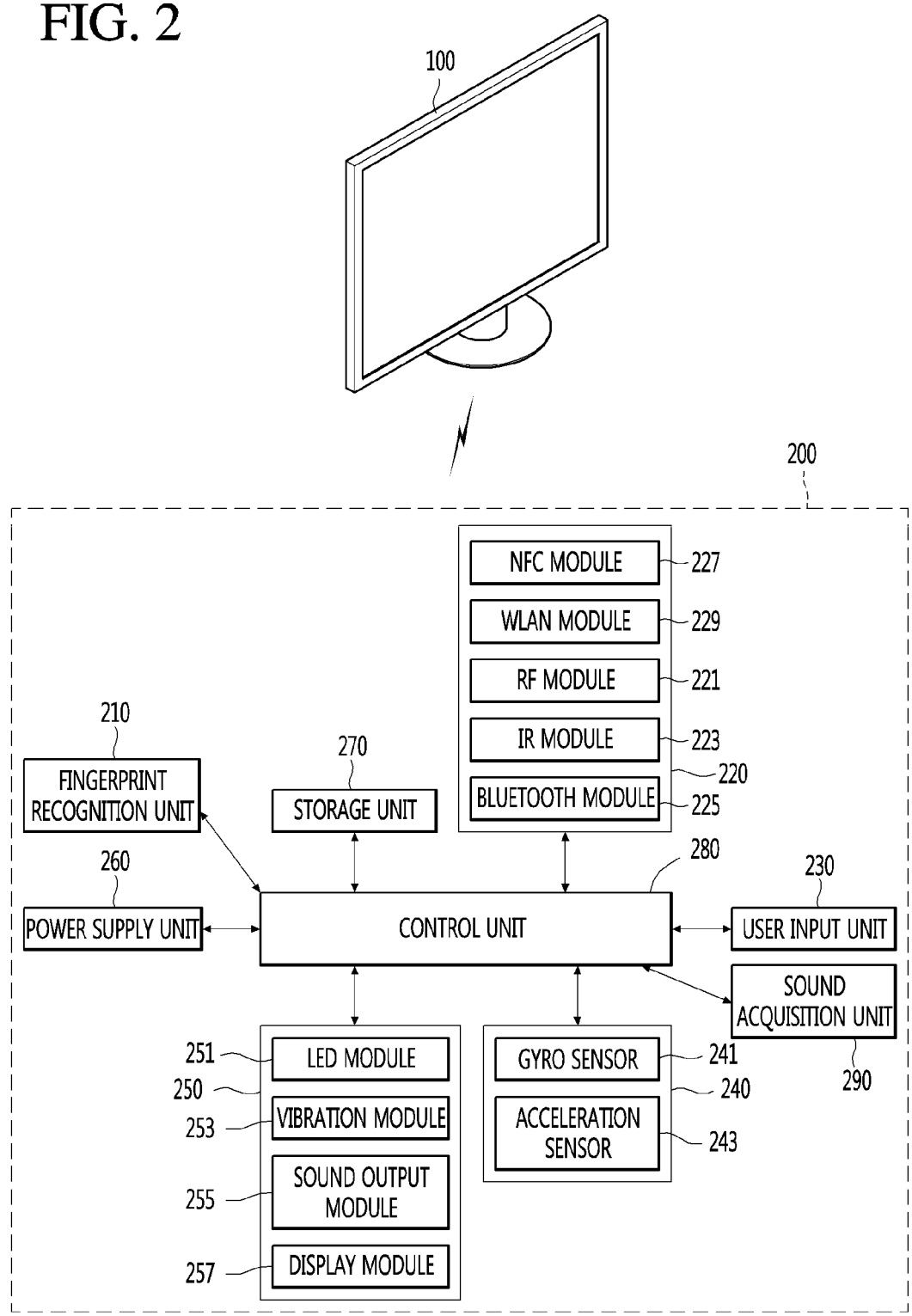
FIG. 2 is a block diagram illustrating a remote control device according to an embodiment of the present invention.
Figure 3:
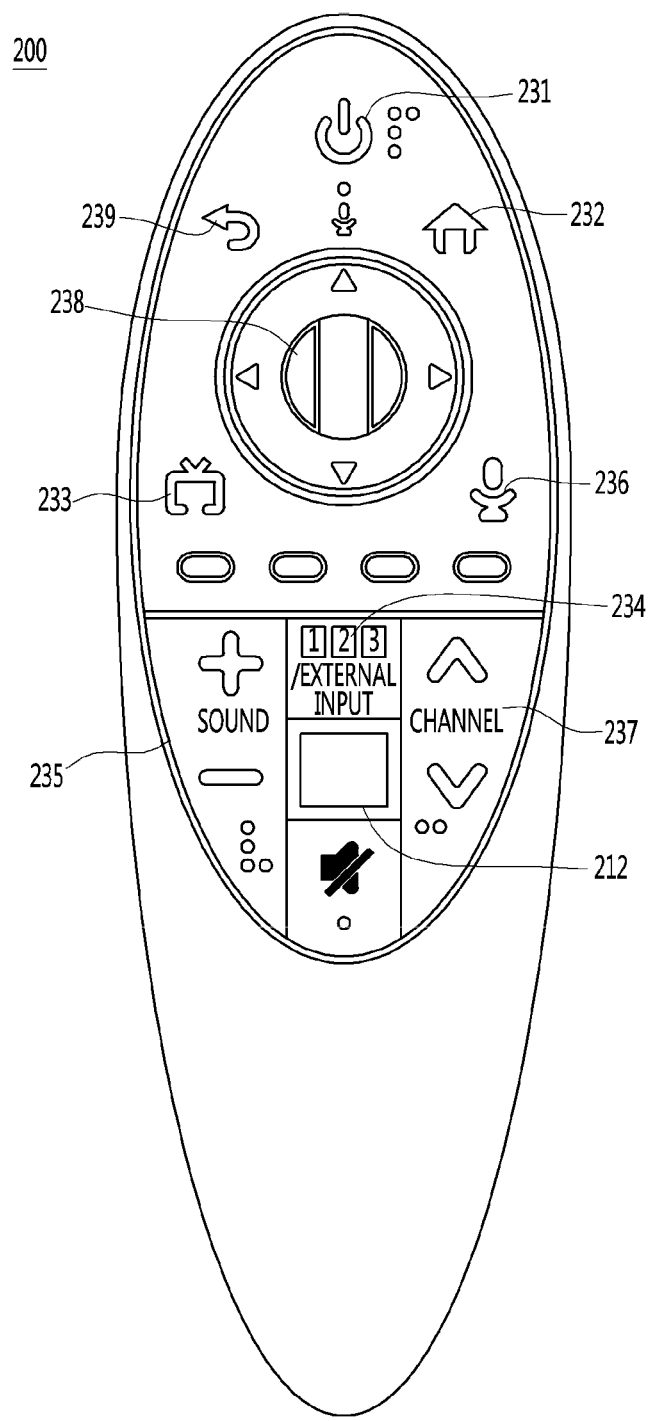
FIG. 3 is a view illustrating an actual configuration of a remote control device according to an embodiment of the present invention.

Then, referring to FIGS. 2 and 3, a remote control device is described according to an embodiment of the present invention.

FIG. 2 is a block diagram illustrating a remote control device according to an embodiment of the present invention and FIG. 3 is a view illustrating an actual configuration of a remote control device according to an embodiment of the present invention.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a voice acquisition unit 290.

Referring to FIG. 2, the wireless communication unit 225 transmits/receives signals to/from an arbitrary any one of display devices according to the above-mentioned embodiments of the present invention.

The remote control device 200 can include an RF module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include an NFC module 227 for transmitting/receiving signals to/from the display device 100 according to the Near Field Communication (NFC) communication standards and a WLAN module 229 for transmitting/receiving signals to/from the display device 100 according to the Wireless LAN (WLAN) communication standards Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present invention, the fingerprint recognition button 212 can perform a push operation and receive a push operation and a fingerprint recognition operation. The power button 231 can be button for turning on/off the power of the display device 100. The power button 232 can be button for moving to the home screen of the display device 100. The live button 233 can be a button for displaying live broadcast programs. The external input button 234 can be button for receiving an external input connected to the display device 100. The voice adjustment button 235 can be button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, FIG. 2 is described.

If the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present invention.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals corresponding to a manipulation of the user input unit 235 or corresponding to signals transmitted from the display device 100. A user can recognize whether the user input unit 235 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for a control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to a control of the remote control device 200. The control unit 280 can transmit a signal corresponding to a predetermined key manipulation of the user input unit 235 or a signal corresponding to a movement of the remote control device 200 sensed by the sensor unit 240 to the display device 100 through the wireless communication unit 225.

Additionally, the voice acquisition unit 290 of the remote control device 200 can obtain voice.

The voice acquisition unit 290 can include at least one microphone 291 and obtain voice through the microphone 291.

Figure 4:
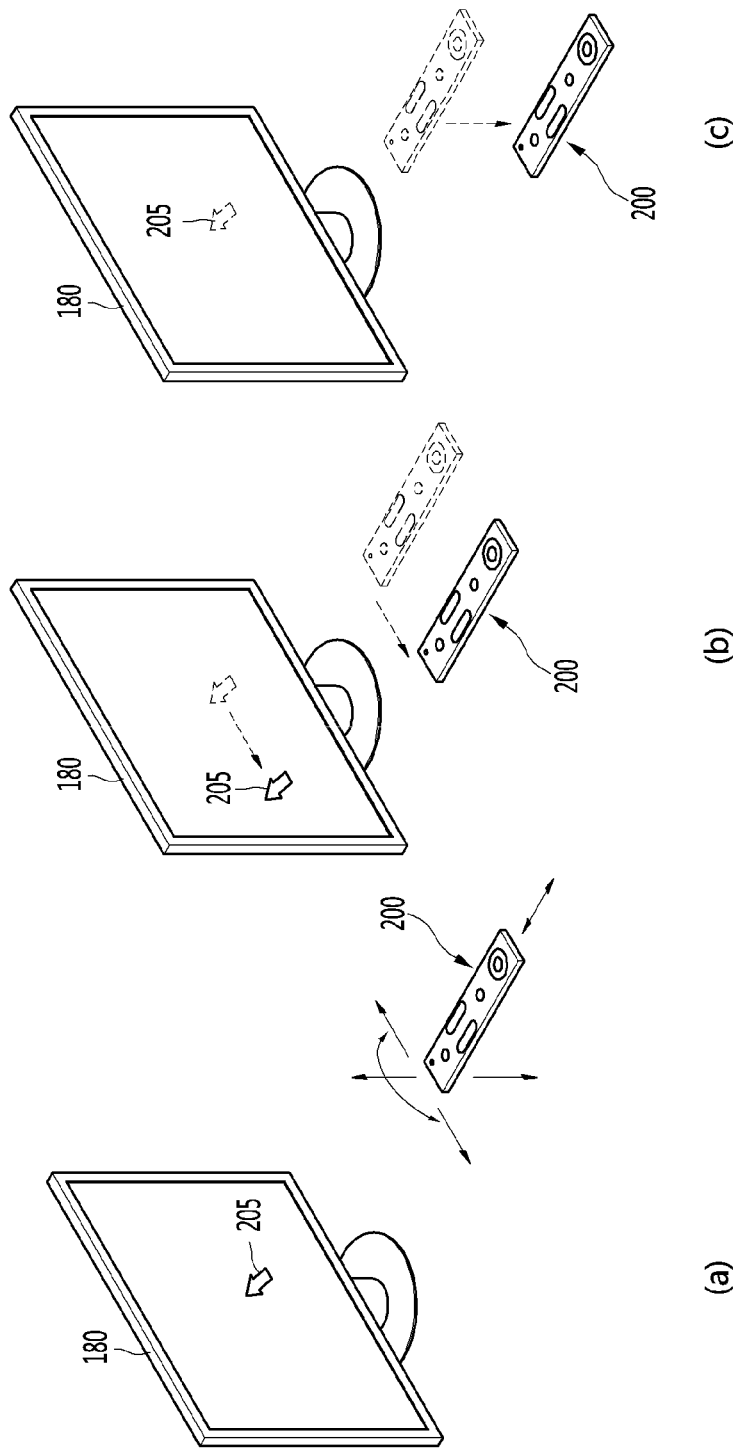
FIG. 4 is a view showing an example of utilizing a remote control device according to an embodiment of the present invention.

Then, FIG. 4 is described.

FIG. 4 is a view of utilizing a remote control device according to an embodiment of the present invention.

FIG. 4A illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote controller.

FIG. 4B illustrates that if a user moves the remote control device 200, the pointer 205 displayed on the display unit 180 of the display device 100 is moved to the left in correspondence thereto.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4C illustrates that while a specific button in the remote control device 200 is pressed, a user moves the remote control device 200 away from the display unit 180. Thus, a selection area in the display unit 180 corresponding to the pointer 205 can be zoomed in and displayed largely.

On the other hand, if a user moves the remote control device 200 close to the display unit 180, a selection area in the display unit 180 corresponding to the pointer 205 can be zoomed out and displayed reduced.

On the other hand, if the remote control device 200 is away from the display unit 180, a selection area can be zoomed out and if the remote control device 200 is close to the display unit 180, a selection area can be zoomed in.

Additionally, if a specific button in the remote control device 200 is pressed, the recognition of a vertical or horizontal movement can be excluded. That is, if the remote control device 200 is moved away from or close to the display unit 180, the up, down, left, or right movement can not be recognized and only the back and fourth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in correspondence to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Figure 5:
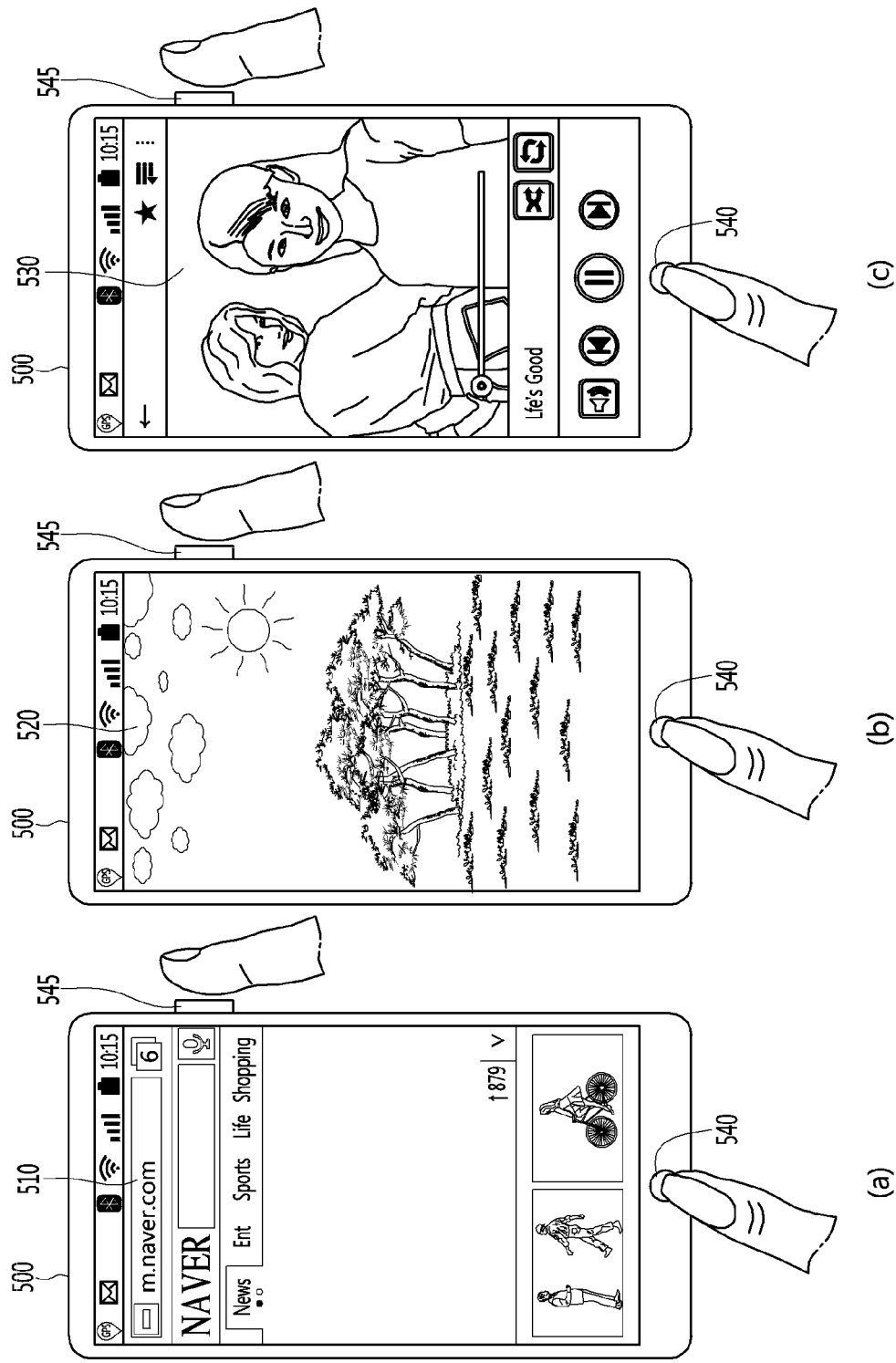
FIG. 5 is a diagram illustrating a method of scraping content in an external device connected to a display device according to an embodiment of the present invention.

FIG. 5 is a diagram illustrating a method of scraping content in an external device connected to a display device according to an embodiment of the present invention.

As shown in FIG. 5, an external device 500 connected to a display device according to an embodiment of the present invention may be a smartphone, a tablet personal computer (PC), a laptop or a PC. Further, a user of the external device 500 may scrape a variety of content including a website 510, a still image 520 and a video 530 displayed on the external device and store scrape data in the external device. For example, as shown in FIG. 5, the user of the external device 500 may scrape content by operation for simultaneously pressing two physical keys 540 and 545 provided in the external device 500 and generate and store the scrape data in a memory of the external device 500. In addition, although not shown in FIG. 5, the user of the external device 500 may scrape data by touching a screen of the external device 500 in a predetermined manner (pattern or dragging) and generate and store scrape data in the memory of the external device 500. Further, although not shown in FIG. 5, the user of the external device 500 may scrape content by executing a scrape application installed in the external device 500 or scrape content using a scrape function provided by an application for executing content 510, 520 and 530 and generate and store scrape data in the memory of the external device 500.

As described above, when the user scrapes content using the external device 500, scrape data is generated. The scrape data may include information on a content URL, a content type, a scrape date and an external device for performing scraping, which is related to a plurality of content scraped in the external device 500.

Figure 6:
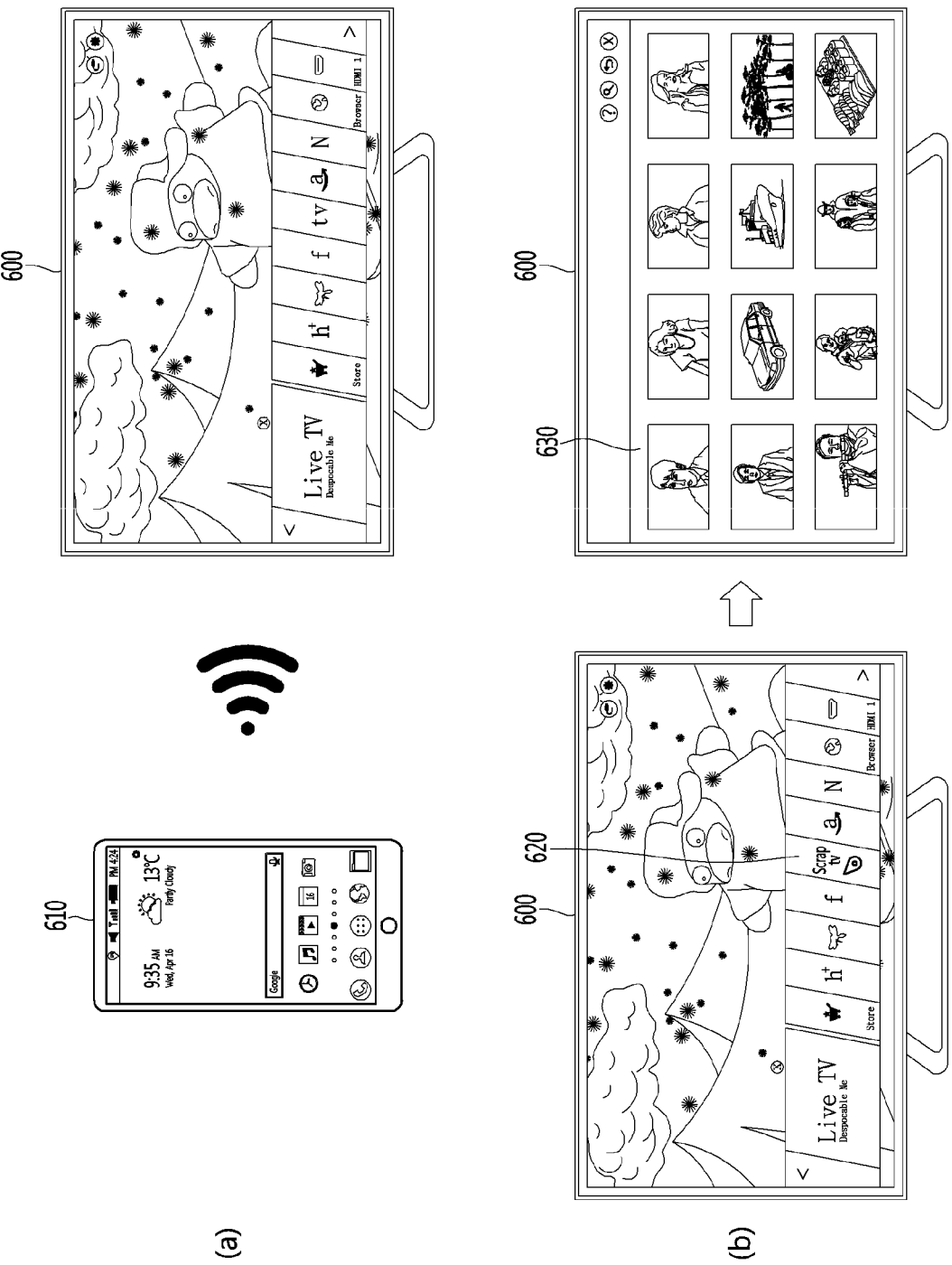
FIG. 6 is a diagram illustrating a method of receiving and post-processing scrape data in a display device according to an embodiment of the present invention.

FIG. 6 is a diagram illustrating a method of receiving and post-processing scrape data in a display device according to an embodiment of the present invention.

As shown in (a) of FIG. 6, a display device 600 according to an embodiment of the present invention may pair with an external device 610. A controller of the display device 600 may perform control to automatically receive scrape data stored in the external device 610 the moment that pairing with the external device is performed. At this time, the controller of the display device 600 may perform control to select and receive only scrape data generated newly after scrape data previously received from the external device 610. As another embodiment, the controller of the display device 600 may perform control to receive scrape data stored in the external device 610 only when a scrape data reception request signal is received from a user after pairing with the external device 610.

As shown in (b) of FIG. 6, when the user executes a scrape application 620, the controller of the display device 600 according to the embodiment of the present invention may perform control to display a scrape album 630 in which thumbnails generated using the scrape data received from the external device 610 are arranged. The controller of the display device 630 according to the embodiment of the present invention may perform control to generate thumbnails using the received scrape data and to display the scrape album 630 in which the thumbnails are arranged, upon receiving the scrape data from the external device 610. The controller of the display device 600 may perform control to process image data included in the scrape data or to connect a content URL included in the scrape data to generate a thumbnail image. Referring to (a) and (b) of FIG. 6, the controller of the display device 600 may perform control to update the scrape data received from the external device, to generate thumbnails of a plurality of content associated with the scrape data and to arrange and display the thumbnails based on a predetermined thumbnail arrangement method, upon pairing with the external device 610.

By the design shown in FIGS. 5 and 6, the user can rapidly and conveniently use scrape data stored using the external device in the display device.

Figure 7:
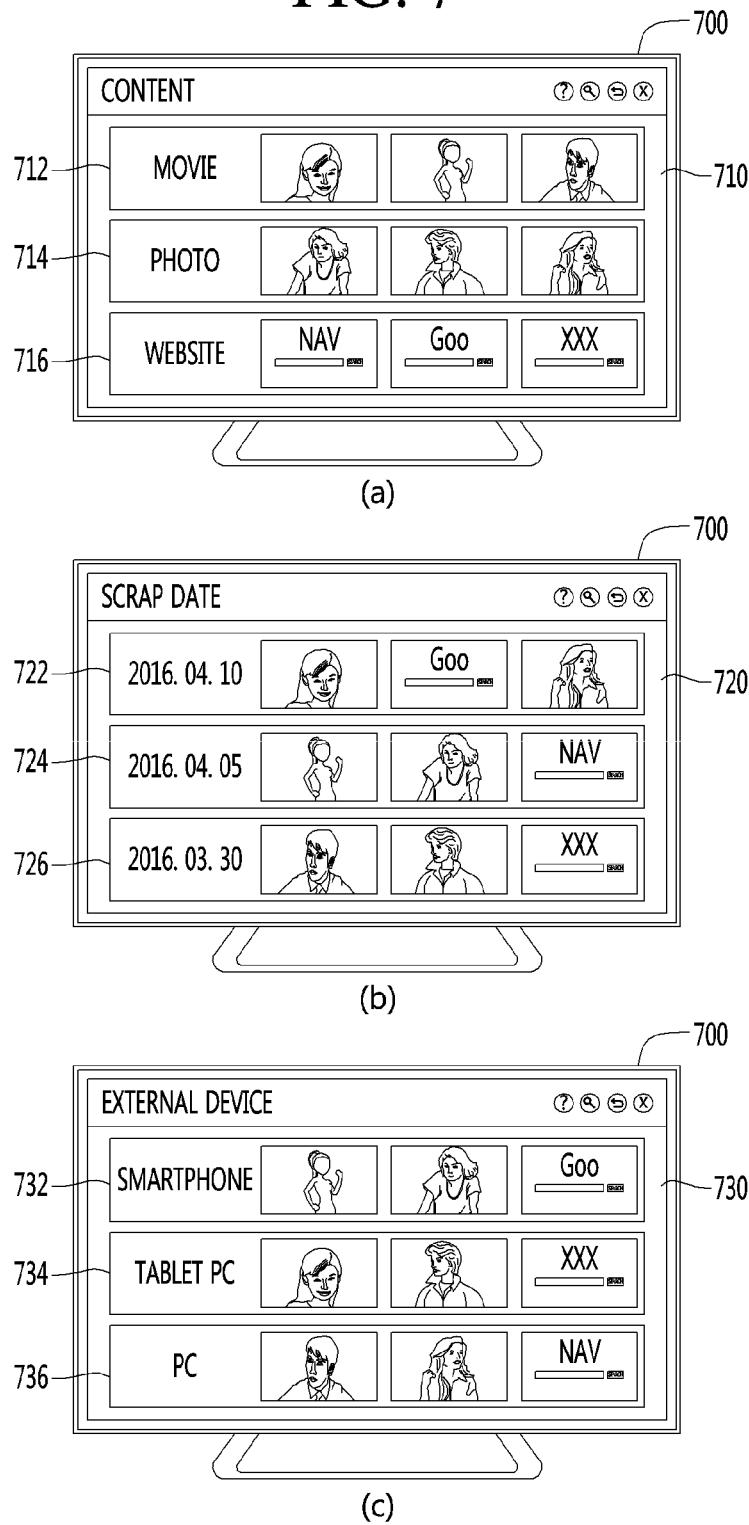
FIG. 7 is a diagram illustrating various methods of arranging thumbnails in a display device according to an embodiment of the present invention.

FIG. 7 is a diagram illustrating various methods of arranging thumbnails in a display device according to an embodiment of the present invention.

As shown in (a) to (c) of FIG. 7, a method of arranging thumbnails in a display device 700 according to an embodiment of the present invention may include a content type arrangement method 710, a scrape date arrangement method 720 and an arrangement method based on an external device for performing scraping 730.

As shown in (a) of FIG. 7, a controller of the display device 700 may arrange thumbnails corresponding to scrape data using the content type arrangement method 710. For example, the controller of the display device 700 may perform control to arrange thumbnails corresponding to movie content in a first row 712, to arrange thumbnails corresponding to photo content in a second row 714 and to arrange thumbnails corresponding to a website in a third row 716. Using the content type arrangement method 710 shown in (a) of FIG. 7, the user can more rapidly search for desired content.

As shown in (b) of FIG. 7, the controller of the display device 700 may arrange thumbnails corresponding to scrape data using the scrape date arrangement method 720. For example, the controller of the display device 700 may perform control to arrange thumbnails corresponding to content scraped on a first date in a first row 722, to arrange thumbnails corresponding to content scraped on a second date in a second row 724 and to arrange thumbnails corresponding to content scraped on a third date in a third row 726. If the scrape date arrangement method 720 shown in (b) of FIG. 7 is used, the user can more rapidly search for desired content when the user remembers the scrape date of specific content.

Additionally, as shown in (c) of FIG. 7, the controller of the display device 700 may arrange thumbnails corresponding to scrape data using the arrangement method based on the external device for performing scraping 730. For example, the controller of the display device 700 may perform control to arrange thumbnails corresponding to content scraped by a first device in a first row 732, to arrange thumbnails corresponding to content scraped by a second device in a second row 734 and to arrange thumbnails corresponding to content scraped by a third device in a third row 736. If the arrangement method based on the external device for performing scraping 730 shown in (b) of FIG. 7 is used, the user can more rapidly search for content scraped by a specific device when the user remembers a device for scraping specific content or when a variety of scrape data received from the devices of several users is mixed.

Figure 8:
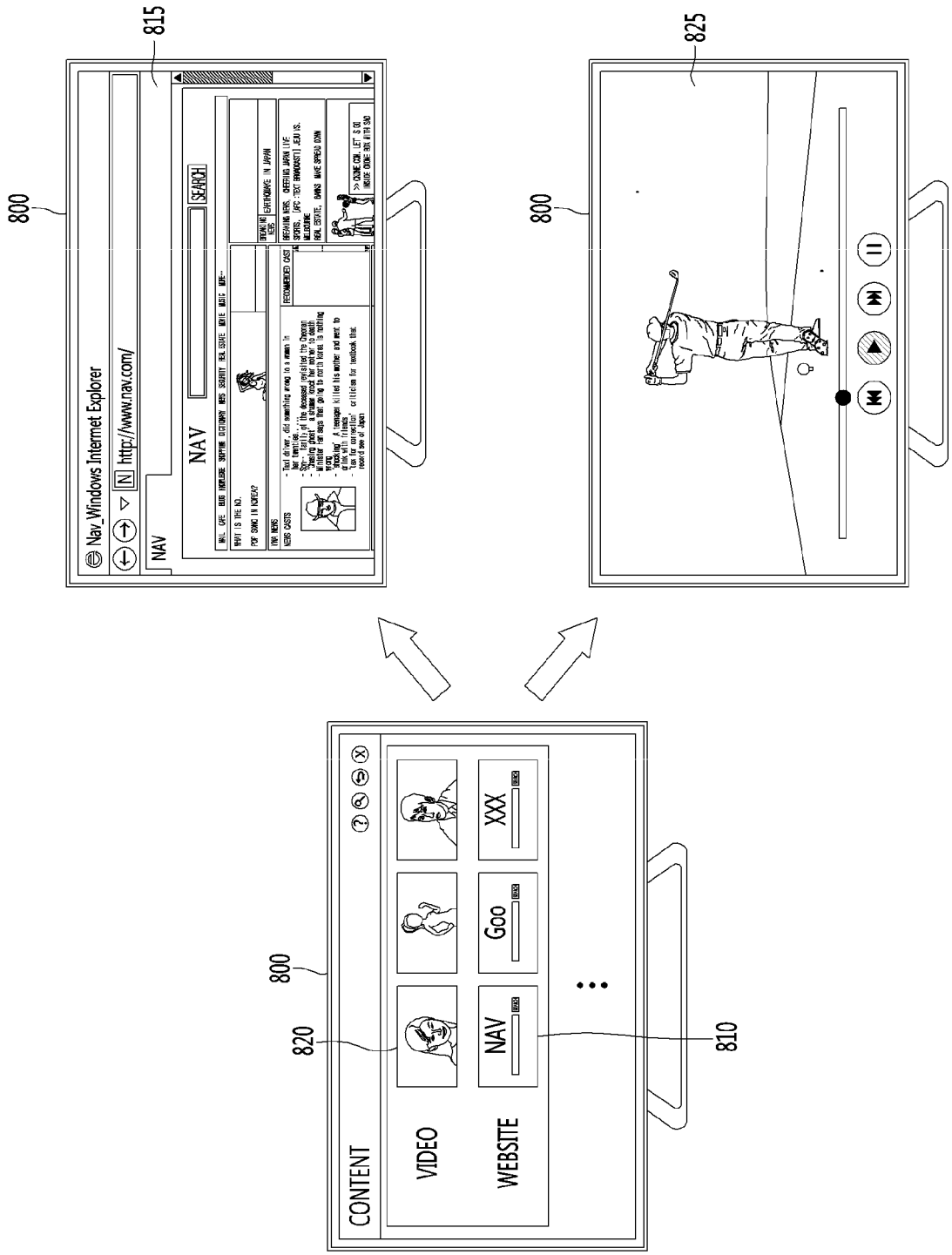
FIG. 8 is a diagram illustrating an example of executing content using a thumbnail in a display device according to an embodiment of the present invention.

FIG. 8 is a diagram illustrating an example of executing content using a thumbnail in a display device according to an embodiment of the present invention.

As shown in FIG. 8, assume that a display device 800 according to an embodiment of the present invention arranges thumbnails using a content type arrangement method. At this time, when the user selects a thumbnail 810 corresponding to specific website content, a controller of the display device 800 may perform control to execute a web browser and to display a specific website 815 on a screen based on content URL information included in the scrape data. Similarly, when the user selects a thumbnail 820 corresponding to specific streaming video content, the controller of the display device 800 may perform control to execute a streaming application for providing the streaming video and to display a specific streaming video 825 on the screen based on content URL information included in the scrape data. Although the website and the streaming video are described as an example in FIG. 8, a variety of content such as photos, encyclopedia entries, books, movie, dramas, broadcast programs or VOD content may be provided in the same manner.

Figure 9:
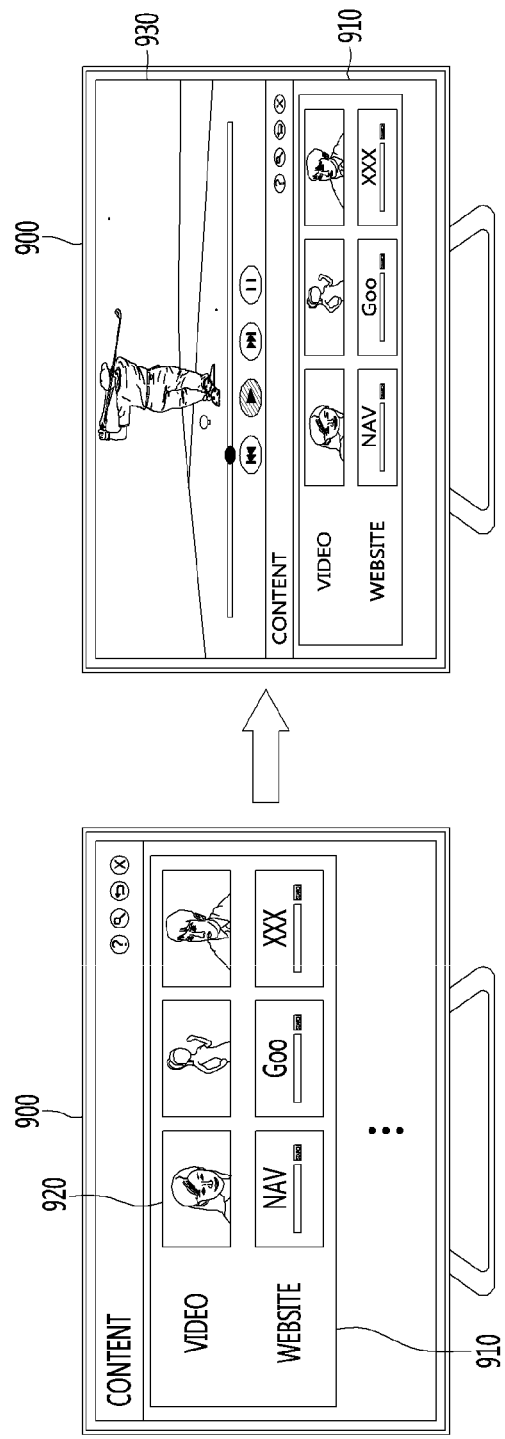
FIG. 9 is a diagram illustrating another example of executing content using a thumbnail in a display device according to an embodiment of the present invention.

FIG. 9 is a diagram illustrating another example of executing content using a thumbnail in a display device according to an embodiment of the present invention.

As shown in FIG. 9, assume that a display device 900 according to an embodiment of the present invention displays a scrape album 910, in which thumbnails are arranged using the content type arrangement method, in the overall area of a screen. At this time, when the user selects a thumbnail 920 corresponding to specific streaming moving content, a controller of the display device 900 may perform control to execute a streaming application for providing the streaming video, to display a specific streaming video 930 in a first area of the screen based on content URL information included in the scrape data, and to display the scrape album 910, which has been displayed in the overall area of the screen, in a second area of the screen.

By the design shown in FIG. 9, the user can search for other scrape data while viewing scraped content.

Figure 10:
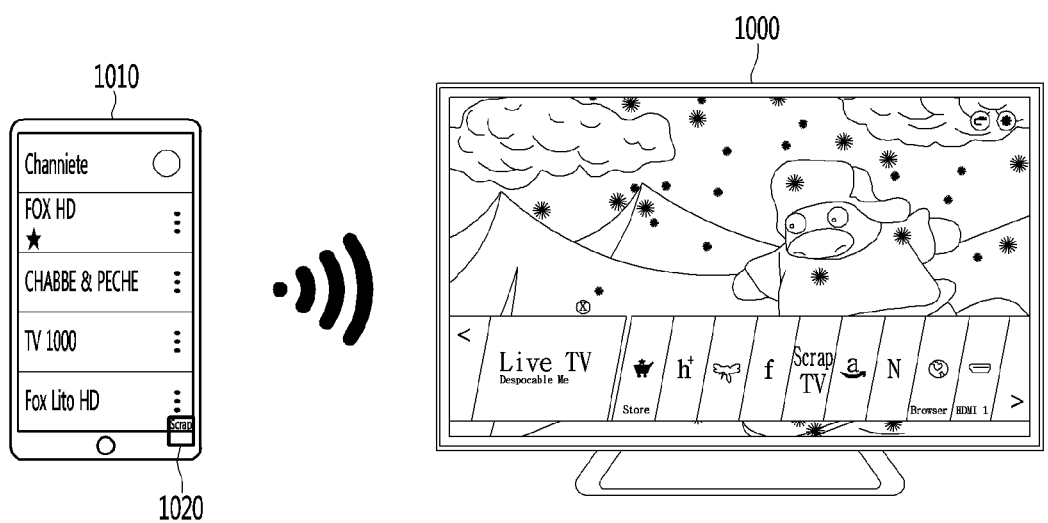
FIG. 10 is a diagram illustrating a method of updating scrape data in a display device according to an embodiment of the present invention.

FIG. 10 is a diagram illustrating a method of updating scrape data in a display device according to an embodiment of the present invention.

Scrape data stored in an external device 1010 may be automatically transmitted the moment that the external device 1010 pairs with a display device 1000 or may be transmitted when the user selects an item 1020 for enabling the external device 1010 to deliver scrape data. In addition, a controller of the display device 1000 may perform control to automatically update only scrape data added newly in addition to scrape data previously received from the external device 1010, upon pairing. For example, when the display device 1000 pairs with the external device 1010 again on April 20 after pairing with the external device to receive scrape data on April 10, the controller of the display device 1000 may perform control to receive only scrape data of content scraped by the external device after April 11.

FIG. 11 is a diagram illustrating a method of setting viewing reservation using scrape data in a display device according to an embodiment of the present invention.

As shown in (a) of FIG. 11, a user of an external device 1110 may receive EPG data using the external device 1110. The external device 1110 may receive and process the EPG data and display a channel list 1120 on a screen. When the user selects a first channel item 1130 from the channel list 1120 displayed on the external device 1110, the external device 1110 may display a first channel setting window 1140 on the screen. The first channel setting window 1140 may include a scrape item, a detailed information item and a viewing reservation item. When the user selects a scrape item through the first channel setting window 1140, the scrape data is stored in a memory of the external device 1110.

As shown in (b) of FIG. 11, a controller of the display device 1100 may perform control to immediately set viewing reservation when scrape data for the first channel item is received from the external device 1110 and to display, on the screen, a viewing reservation notification window 1150 indicating that viewing reservation has been set. Further, although not shown in FIG. 11, the controller of the display device 1100 may perform control to load a website or execute an application for providing related VOD content when scrape data for the first channel item is received after a broadcast time of content provided by the first channel item. The related VOD content may be the same content as drama content of a corresponding channel or content of another channel which is broadcast at the same time.

Figure 12:
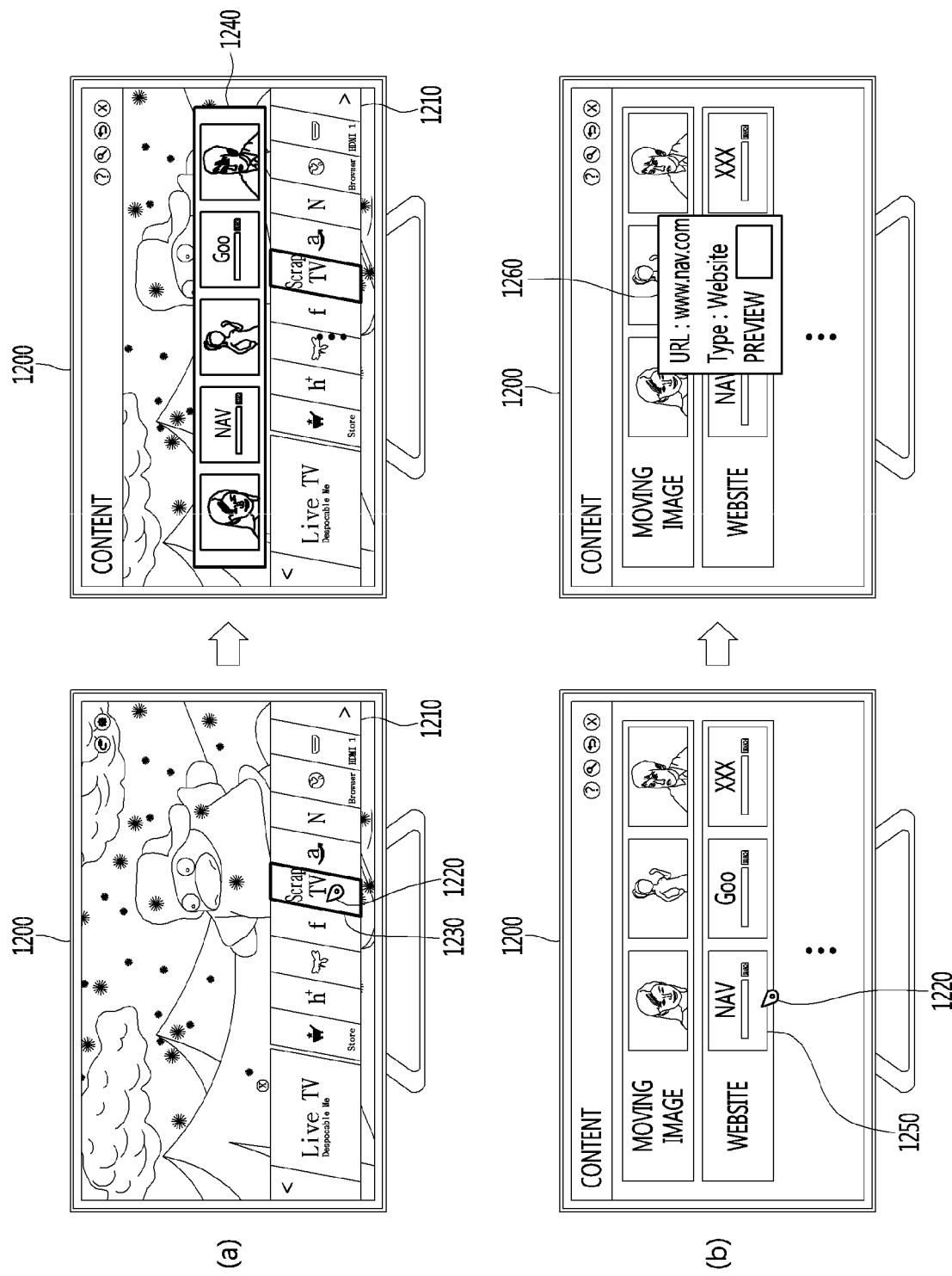
FIG. 12 is a diagram showing an example of searching for scrape data in a display device according to an embodiment of the present invention.

FIG. 12 is a diagram showing an example of searching for scrape data in a display device according to an embodiment of the present invention.

As shown in (a) of FIG. 12, a controller of a display device 1200 according to an embodiment of the present invention may perform control to display an application list 1210 in a first area of a screen and the application list 1210 may include a scrape application icon 1230. When a signal indicating that a pointer 1220 is located on the scrape application icon 1230 for a predetermined time or more or a signal indicating that the user selects the screen application icon 1230 using the pointer 1220 is sensed, the controller of the display device 1200 may perform control to display a scrape list 1240, in which thumbnails corresponding to the scrape data are arranged, in a second area of the screen. The controller of the display device 1200 may perform control to arrange the thumbnails included in the scrape list 1240 in reception order.

As shown in (b) of FIG. 12, the controller of the display device 1200 according to the embodiment of the present invention may perform control to display a popup window 1260 when a signal indicating that a pointer 1220 is located on a thumbnail 1250 corresponding to specific content for a predetermined time or more or a signal indicating that the user selects the thumbnail 1250 corresponding to the specific content using the pointer 1220 is received. The popup window 1260 may include URL information, content type information, related application information and a preview item of the content corresponding to the selected thumbnail.

Figure 13:
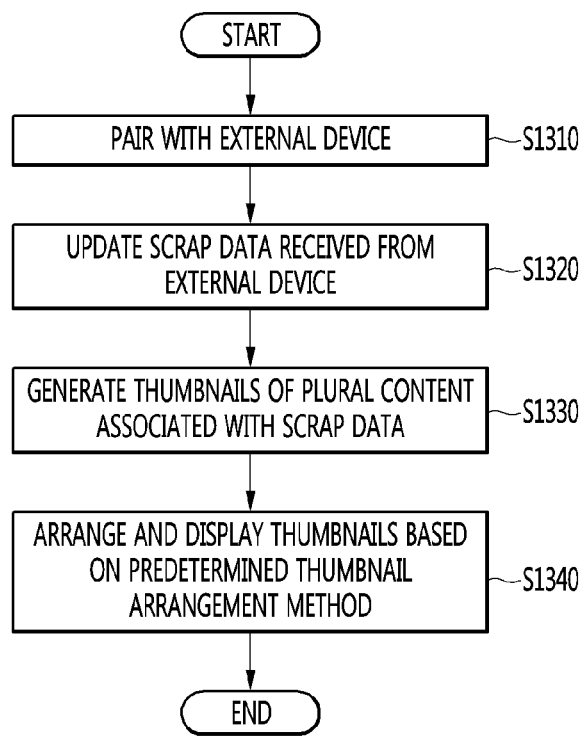
FIG. 13 is a flowchart illustrating a method of controlling a display device according to an embodiment of the present invention.

FIG. 13 is a flowchart illustrating a method of controlling a display device according to an embodiment of the present invention.

As shown in FIG. 13, a method of controlling a display device according to an embodiment of the present invention may include step S1310 of pairing with an external device, step S1320 of updating scrape data received from the external device, step S1330 of generating thumbnails of a plurality of content associated with the scrape data and step S1340 of arranging and displaying the thumbnails based on a predetermined thumbnail arrangement method. A detailed description of the steps is equal to the above description and thus a repeated description will be omitted.

According to an embodiment of the present invention, the above-described method is implemented as code that can be written to a processor-readable recording medium and can thus be read by a processor. Examples of the processor-readable recording medium include a ROM, a RAM, a CD-ROM, a magnetic tape, a floppy disk, an optical data storage, and a carrier wave (e.g., data transmission over the Internet).

The display device according to the present invention should not be limited to configurations and methods of the above-described embodiments, and all or some of the embodiments may be selectively combined with one another to achieve various alterations.

What is claimed is:

1. A method of controlling a display device, the method comprising:
    pairing with an external device;
    updating scrape data received from the external device upon pairing with the external device, wherein the scrape data corresponds to information related to a plurality of content at the external device, the scrape data comprising at least a content URL and a content type, a scrape date, or an external device for performing scraping;
    generating thumbnails of the plurality of content associated with the scrape data;
    displaying the thumbnails based on a predetermined thumbnail arrangement scheme, wherein the predetermined thumbnail arrangement scheme includes arranging the thumbnails based on the external device that performed scraping of each corresponding scrape data such that thumbnails corresponding to content scraped by different external devices are arranged to be visually distinguished, wherein the thumbnails are generated by connecting to the content URL to obtain information for generating one or more of the thumbnails;
    setting a viewing reservation corresponding to a channel item and displaying a viewing reservation notification indicating that the viewing reservation has been set when scrape data for the channel item is received from the paired external device; and
    executing an application for providing video on-demand (VOD) related to content corresponding to the channel item when the scrape data for the channel item is received from the paired external device after a broadcast time of the content corresponding to the channel item has elapsed.

2. The method according to claim 1, wherein the predetermined thumbnail arrangement scheme further includes arrangement according to a content type or a scrape date.

3. The method according to claim 1, further comprising displaying content using a content URL corresponding to a selected thumbnail of the displayed thumbnails when an input for selecting the selected thumbnail is received via a user input interface of the display device.

4. The method according to claim 3, wherein the displayed thumbnails are displayed in a first area of a screen and content corresponding to the selected thumbnail is displayed in a second area of the screen.

5. The method according to claim 1, wherein updating scrape data comprises receiving from the external device only new scrape data since a previous update.

6. The method according to claim 1, further comprising storing, at the external device, scrape data of content displayed on the captured screen when a screen is captured at the external device.

7. The method according to claim 1, further comprising setting a viewing reservation in a schedule corresponding to electronic program guide information of the scrape data.

8. The method according to claim 1, further comprising:
    displaying a popup window when a pointer of a remote control device associated with the display device is positioned on at least one of the displayed thumbnails for at least a predetermined time,
    wherein the popup window comprises URL information, content type information, related application information, and a content preview item corresponding to the at least one of the displayed thumbnails.

9. A display device comprising:
    a tuner;
    a communication interface configured to pair with an external device;
    a user input interface configured to receive user input;
    a memory configured to store information;
    a display configured to display information; and
    a controller configured to:
        pair with the external device via the communication interface;
        update scrape data received from the external device via the communication interface upon pairing with the external device, wherein the scrape data corresponds to information related to a plurality of content at the external device, the scrape data comprising at least a content URL and a content type, a scrape date, or an external device that performed scraping;
        generate thumbnails of the plurality of content associated with the scrape data;
        cause the display to display the thumbnails based on a predetermined thumbnail arrangement scheme, wherein the predetermined thumbnail arrangement scheme includes arranging the thumbnails based on the external device that performed scraping of each corresponding scrape data such that thumbnails corresponding to content scraped by different external devices are arranged to be visually distinguished, wherein the thumbnails are generated by connecting to the content URL to obtain information for generating one or more of the thumbnails;

set a viewing reservation corresponding to a channel item and cause the display to display a viewing reservation notification indicating that the viewing reservation has been set when scrape data for the channel item is received from the paired external device; and execute an application for providing video on-demand (VOD) related to content corresponding to the channel item when the scrape data for the channel item is received from the paired external device after a broadcast time of the content corresponding to the channel item has elapsed.

10. The display device according to claim 9, wherein the predetermined thumbnail arrangement scheme further includes arrangement according to a content type or a scrape date.

11. The display device according to claim 9, wherein the controller is further configured to cause the display to display content using a content URL corresponding to a selected thumbnail of the displayed thumbnails when an input for selecting the selected thumbnail is received via the user input interface.

12. The display device according to claim 11, wherein the controller is further configured to cause the display to display the displayed thumbnails in a first area of a screen and to display content corresponding to the selected thumbnail in a second area of the screen.

13. The display device according to claim 9, wherein the controller is further configured to update scrape data by receiving from the external device only new scrape data since a previous update.

14. The display device according to claim 9, wherein the controller is further configured to cause the memory to store scrape data of content displayed on the captured screen when a screen is captured at the external device.

15. The display device according to claim 9, wherein the controller is further configured to set a viewing reservation in a schedule corresponding electronic program guide information of the scrape data.

16. The display device according to claim 9, wherein the controller is further configured to cause the display to display a popup window when a pointer of a remote control device associated with the display device is positioned on at least one of the displayed thumbnails for at least a predetermined time, wherein the popup window comprises URL information, content type information, related application information, and a content preview item corresponding to the at least one of the displayed thumbnails.

* * * * *